(12) United States Patent
Apfel (10) Patent No.: US 7,139,555 B2
(45) Date of Patent: *Nov. 21, 2006

(54) UNIFIED CONTACT LIST

(75) Inventor: Darren Alexander Apfel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/215,649

(22) Filed: Aug. 30, 2005

(65) Prior Publication Data

US 2005/0288006 A1 Dec. 29, 2005

Related U.S. Application Data

(63) Continuation of application No. 10/633,078, filed on Aug. 1, 2003, now Pat. No. 6,973,299.

(51) Int. Cl.
*H04M 1/663* (2006.01)
(52) U.S. Cl. .................. 455/412.2; 455/412.1; 455/418; 379/266.1; 709/206; 709/227
(58) Field of Classification Search ............ 455/412.2, 455/412.1, 418; 379/266.1; 709/206, 227
See application file for complete search history.

(56) References Cited

U.S. PATENT DOCUMENTS

| | | | | |
|---|---|---|---|---|
| 5,543,781 A | * | 8/1996 | Ganucheau et al. | 340/7.52 |
| 5,835,706 A | * | 11/1998 | Hikichi et al. | 714/49 |
| 5,915,214 A | * | 6/1999 | Reece et al. | 455/406 |
| 6,996,627 B1 | * | 2/2006 | Carden | 709/237 |
| 2003/0007629 A1 | * | 1/2003 | Unsai | 379/327 |
| 2003/0182232 A1 | * | 9/2003 | Zelter et al. | 705/51 |

* cited by examiner

*Primary Examiner*—Danh Cong Le
(74) *Attorney, Agent, or Firm*—Workman Nydegger (57) ABSTRACT

Methods, systems, and computer program products for maintaining current contact and metadata information for one or more contacts. A mobile phone stores contact information for multiple forms of mobile phone communication with the contacts. Each contact is identified as either an automatic live contact to be synchronized as new information becomes available or as another contact that will not be synchronized as new information becomes available. The mobile phone communicates the contacts to a data service provider for backup storage and update processing. From automatic contact and metadata information updates initiated by and received from the data service provider the mobile phone periodically updates automatic live contacts. Based on the synchronized contact and metadata information, the mobile phone initiates communication with one of the contacts. Example communication includes voice, email, instant messaging, short message service, multimedia message service, locate, and peer to peer application (such as gaming) communication.

20 Claims, 7 Drawing Sheets

UNIFIED CONTACT LIST

CROSS-REFERENCE TO RELATED APPLICATIONS

This application is a continuation of application Ser. No. 10/633,078, filed Aug. 1, 2003, now U.S. Pat. No. 6,973,299, and entitled "UNIFIED CONTACT LIST" and which is incorporated here by reference.

BACKGROUND OF THE INVENTION

1. The Field of the Invention

The present invention relates to contact information for mobile phones. More particularly, the present invention relates to methods, systems, and computer program products for maintaining current contact and metadata information for multiple forms of communication with a contact that can be initiated from a mobile phone.

2. Background and Related Art

Mobile phones have become increasing sophisticated both in terms of hardware and software. Today, many mobile phones support access to a variety of data services, including email, web pages, and instant messaging. Traditionally, however, integration between the applications providing access to these data services has been poor. For example, mobile phones (and even personal computers for that matter) typically have maintained separate contact information for instant messaging and other applications. Furthermore, the presence, status, and other live contact information that make instant messaging such an attractive form of communication for many mobile phone users have not been available for other applications. As described in further detail below, this lack of integration detracts from the user experience and therefore tends to reduce mobile phone usage.

Figure 1:
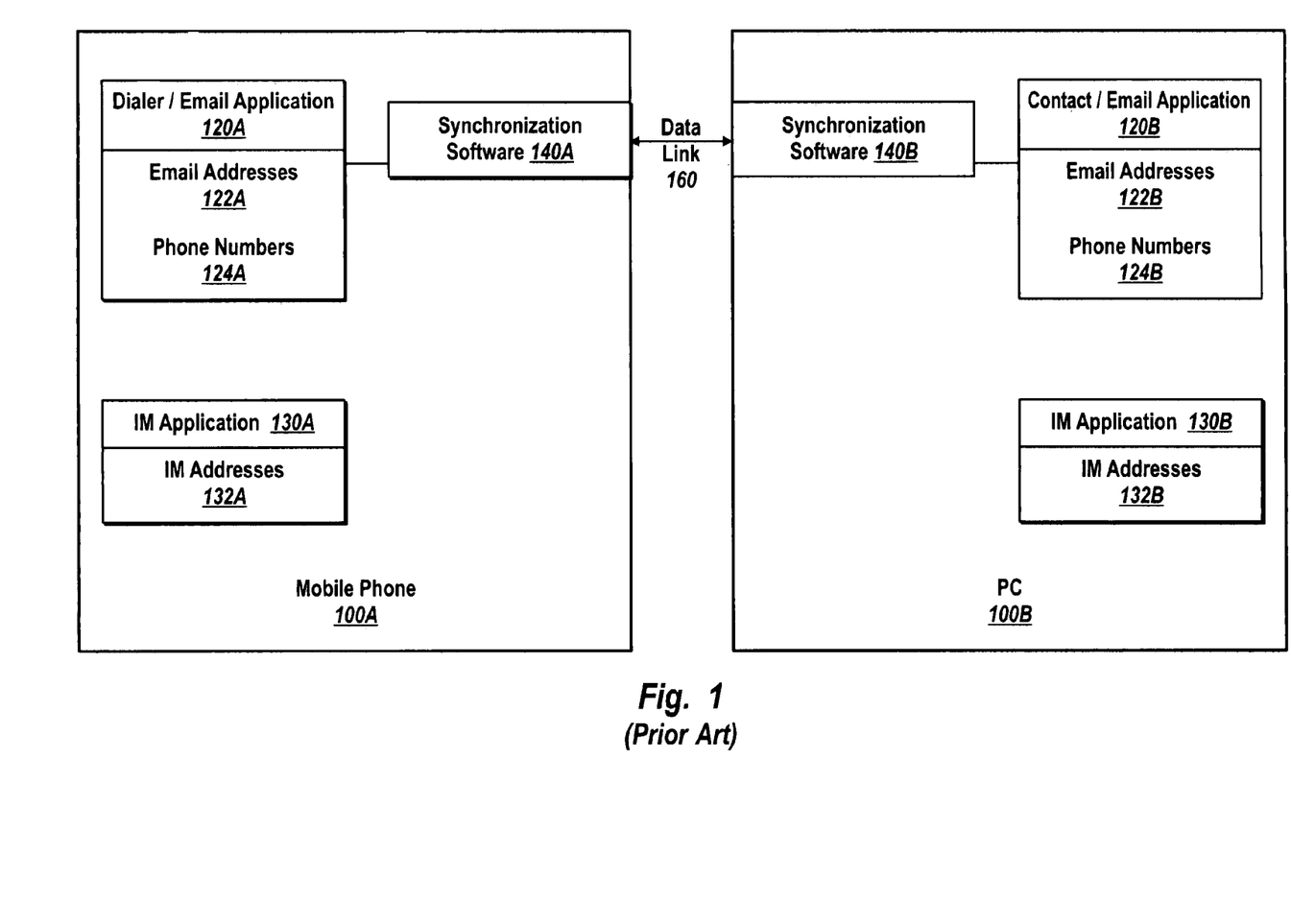
FIG. 1 shows contact information for a prior art mobile phone and personal computer.

For example, as illustrated by mobile phone 100A of FIG. 1, dialer/email application 120A maintains email addresses 122A and phone numbers 124A, and instant messaging application 130A maintains instant messaging addresses 132A. Similarly, at PC 100B, contact/email application 120B maintains email addresses 122B and phone numbers 124B, and instant messaging application 130B maintains instant messaging addresses 132B. Among other things, separate contact information requires selecting a desired application and then a contact within that application in order to initiate communication with the contact. In other words, to send an instant message to the sender of an email message being read in email application 120A, instant message application 130A must be selected first and only then can the corresponding instant message address for the sender of the email message be selected from instant message addresses 132A—it simply is not possible to initiate an instant message from email application 120A. Furthermore, because the contact information is separate, instant message application 130A may not have contact information for the sender of the email message. So even after the extra effort of switching applications, it may not be possible to initiate an instant message. For most mobile phone users, missing contact information and changing from one application to another in order to select a contact detract from a positive user experience.

With separate contact information for different applications, it also has not been possible to maintain accurate metadata for a contact across applications. For example, there is no indication in dialer/email application 120A whether or not a contact is currently online or otherwise available. Metadata is helpful, however, because it provides a social context for initiating communication based on a contact's current availability. That is, if a contact is currently attending a meeting, it may not be appropriate to reach the contact with a voice call, but an email or even an instant message may be acceptable depending on the circumstances. Metadata information provides clues into what form of communication is best suited to reaching a contact, given the current circumstances.

Because contact information is application specific, mobile phone users enter contact information for each application manually. As a result, contact information is duplicated between the applications, and as noted above, often is incomplete. For example, a contact's name would be entered at least twice in mobile phone 100A: once for dialer/email application 120A and once for instant messaging application 130A, assuming a user goes through the trouble of manually adding contact information for each application. Since contact information usually is entered as needed, it is difficult for users to remember what contact information has been entered for each application. At times, therefore, users may think that email addresses 122A include an email address for a contact or that instant message addresses 132A include an instant message address for a contact, when in reality, only a phone number has been entered for the contact. Having email addresses 122B, phone numbers 124B, and instant messaging addresses 132B at PC 100B often contributes to this confusion because the user may remember having entered the information without remembering where the information was entered.

In order to improve the usability of certain applications, limited synchronization software has been developed for mobile phones. For example, the dialer/email application 120A of mobile phone 100A includes synchronization software 140A. Synchronization software 140A connects dialer/email application 120A to contact information at personal computer 100B through data link 160 and synchronization software 140B. Synchronization software 140A and 140B is helpful because it allows email addresses 122A and 122B and phone numbers 124A and 124B to be shared between mobile phone 100A and PC 1001B. Note, however, that the synchronization software does not synchronize IM addresses 132A and 132B. While it may be possible to develop and load separate synchronization software for different applications, this solution leads to poor utilization of mobile phone resources and user confusion.

It also should be noted that use of data link 160 in conjunction with synchronization software 140A and 140B is part of an explicit synchronization operation. Mobile phone 100A must be in relatively close proximity to PC 100B in order to make a cable, infrared, or other wireless connection prior to initiating the synchronization software. Once the connection has been made, synchronization software 140A can be initiated on mobile phone 100A and synchronization software 140B can be initiated on PC 100B. During synchronization, mobile phone 100A generally is unavailable for other tasks. Some mobile phones have the ability to synchronize directly with a server, and therefore in some circumstances, PC 100B may be replaced by a server.

After the user-initiated synchronization of email addresses 122A and phone numbers 124A, which is only a subset of the contact information at mobile phone 100A, the connection is broken (i.e., the connection is not a continuous live connection) and contact information on mobile phone 100A and on PC 100B is subject to becoming stale as changes or updates are made, and even after synchronization, no metadata, such as status or presence information, is available. Furthermore, because no backup copy is created for changes made to contact information at the mobile phone 10A, updated contact information at mobile phone 100A is at risk of being lost as a result of hardware, software, and/or power failures, or if the mobile phone 100A is misplaced. Accordingly, methods, systems, and computer program products that maintain current contact and metadata information for a contact that allows multiples forms of communication to be initiated from a mobile phone are desired.

BRIEF SUMMARY OF THE INVENTION

The present invention extends to methods, systems, and computer program products for maintaining current contact and metadata information. In accordance with example implementations, a mobile phone stores contact information for multiple forms of communication with one or more contacts. Within the mobile phone, each contact is identified as either an automatic live contact, to be automatically synchronized as new information becomes available, or as a contact that will not be automatically synchronized as new information becomes available. The mobile phone communicates the one or more contacts to a data service provider for backup storage and update processing so that as new information becomes available for an automatic live contact, the data service provider can synchronize the mobile phone with the new information. Periodically, the mobile phone synchronizes the contact with automatic contact and metadata information updates that are initiated by the data service provider and received through the mobile phone carrier. Based on the synchronized contact and metadata information, the mobile phone initiates an appropriate form of communication with one of the automatic live contacts, given the circumstances.

The data service provider receives metadata or contact information updates from a variety of sources. For example, if user information that is stored within a mobile phone changes, the mobile phone sends a contact information update for the changed user information to the data service provider. Similarly, as metadata changes occur at the mobile phone, the mobile phone sends a metadata information update to the data service provider. The data service provider reviews the contact lists it has received from various mobile phones, personal computers, personal digital assistants, and the like, to determine if any contact lists identify the user of the mobile phone as an automatic live contact. If so, the data service provider sends the new contact and/or metadata information to each mobile phone that identifies the contact as an automatic live contact. Otherwise, the changed metadata and contact information are simply stored with the corresponding contact at the data service provider so that if and when the data service provider receives an explicit request for contact or metadata information, the data service provider can send the new contact and metadata information to the requester. In one implementation, explicit requests represent a request to restore one or more contacts to a mobile phone.

Forms of communication for the one or more contacts include, for example, voice, email, instant messaging, short message service (SMS), multimedia message service (MMS), locate, and game or other peer-to-peer communication. Over time, a contact may be changed to and from an automatic live contact as desired. In some implementations, a portion of the contact information may be read-only at the mobile phone so that only contact and metadata information updates received from the data service provider can change the read-only portion of the contact information. Alternatively, once the read-only portion of the contact information is changed at a mobile phone, the mobile phone may send an indication to the data service provider that the contact information will be managed at the mobile phone and that no further updates should be received for the read-only portion. The mobile phone makes the read-only portion read-write. In another example implementation, the mobile phone may continue to store a read-only portion of contact information that is updated by the data service provider, but add a read-write portion of the changed contact information that is managed at the mobile phone.

A mobile phone may send permissions information to the data service provider specifying who is allowed to receive contact or metadata information updates corresponding to a user of the mobile phone. The permissions information may be sent in response to a permission request from the data service provider, such as when a mobile phone attempts to add a contact as an automatic live contact. A mobile phone may register capabilities with the data service provider to be sent with contact and metadata information updates, or capabilities may be exchanged when a session is initiated. Metadata information updates for a mobile phone may be sent to the data service provider automatically based on changes in the operating mode of the mobile phone, such as when switching the phone on or off, to vibrate or ring mode, or from taking or ending a call.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for maintaining current contact and metadata information for initiating multiple forms of mobile phone communication with a contact. The embodiments of the present invention may comprise one or more special purpose and/or one or more general purpose computers including various computer hardware, as discussed in greater detail below.

Figure 2:
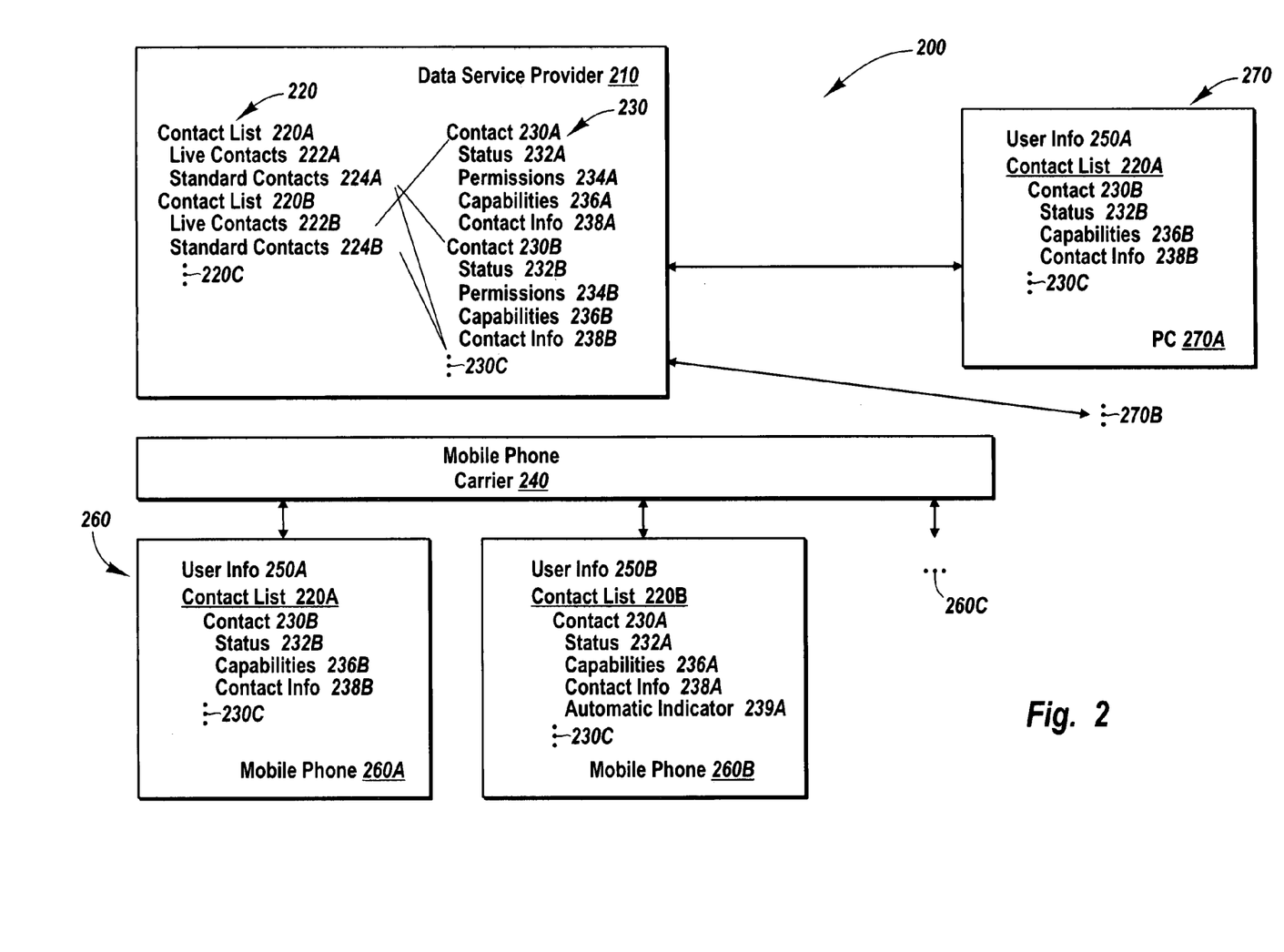
FIG. 2 illustrates an example operating environment for the present invention.

FIG. 2 illustrates an example operating environment 200 for the present invention. The example operating environment 200 includes a data service provider 210, a mobile phone carrier 240, mobile phones 260, and one or more personal computers 270. Mobile phone carrier 240 provides basic voice and data signaling, such as cellular site identification, power level, incoming call, etc., for mobile phones 260. Among other things, data service provider 210 provides a variety of data services, such as text messaging, web access, email, instant messaging, multimedia messaging, and the like, for mobile phones 260. As described in greater detail below, data service provider 210 also maintains current contact and metadata information for contacts.

To begin, a mobile phone stores contact information for multiple forms of communication with one or more contacts. For example, mobile phone 260A stores contact list 220A, which includes contact 230B and other contacts 230C. Contact 230B includes metadata, such as status/presence information 232B and capabilities 236B, and contact information 238B for multiple forms of mobile phone initiated communication. Status/presence information 232B, capabilities 236B, and contact information 238B are described in more detail below. Mobile phone 260A also stores user information 250A in the form of current contact, status, presence, capabilities, and permissions information for a user or owner of mobile phone 260A and PC 270A. The permission information determines what information is available and who is able to receive updates for that information. For example, a mobile phone user may want only certain contact or metadata information, such as an email address, to be generally available, whereas the user's mobile phone number is available only to certain others. In some implementations, the permissions information is stored only at data service provider 210.

Similarly, mobile phone 260B stores contact list 220B, which includes contact 230A and other contacts 230C. Contact 230A also includes metadata, such as status/presence information 232A and capabilities 236A, contact information 238A for multiple forms of mobile phone initiated communication, and automatic contact indicator 239A to indicate that contact 230A should be updated by data service provider 210 as new information becomes available. Note that the automatic contact indicator 239A may take any of a variety of forms, including an explicit indicator as shown, the absence of an indicator, etc. Mobile phone 260B also stores user information 250B in the form of current contact, status, presence, capabilities, and permissions information for a user or owner of mobile phone 260B. User information 250B additionally may include a picture or graphic that the contact publishes to represent himself or herself, commonly referred to as an avator. Other metadata, such as presence and status information may be overlaid on the picture or graphic, or displayed in text.

In an example implementation, mobile phone 260A creates contact list 220A and mobile phone 260B creates contact list 220B based on user input. At least initially, status/presence information 232A and 232B and capabilities 236A and 236B generally will be empty because the mobile phone user is unlikely to have this information, and in many circumstances it makes sense for this information to be read-only. Status/presence information 232A and 232B and capabilities 236A and 236B represent the type of information that mobile phones 260A and 260B expect to received from data service provider 210 through mobile phone carrier 240.

As indicated above, in some implementations a portion of the contact information may be read-only at the mobile phone such that only contact and metadata information updates received from the data service provider can change the read-only portion of the contact information. Alternatively, once the read-only portion of the contact information is changed at a mobile phone, the mobile phone may send an indication to the data service provider that the contact information will be managed at the mobile phone and that no further updates should be received for the read-only portion. The mobile phone makes the read-only portion read-write. In another example implementation, the mobile phone may continue to store a read-only portion of contact information that is updated by the data service provider, but add a read-write portion of the changed contact information that is managed at the mobile phone.

Mobile phones 260 identify each contact as either an automatic live contact to be automatically synchronized when new information becomes available or as a contact that will not be automatically synchronized as new information becomes available. By designating contacts to be automatically updated, the mobile phone's user is able to control airtime, bandwidth, and/or processing requirements at the mobile phone. In other words, limiting the contacts that data service provider 210 automatically updates reduces the mobile phone's airtime, bandwidth, and processing consumption.

In the example operating environment 200 that is illustrated in FIG. 2, there are two basic types of contacts: live contacts and standard contacts. Live contacts an automatic indicator, are automatically updated by data service provider 210 as new information becomes available, whereas live contacts without an automatic indicator are manually updated by data service provider 210 when explicitly requested by a mobile phone. In any case, all changes to a users contact or metadata information are automatically sent to data service provider 210 for processing as described above. Standard contacts, such as contact 230B and other contacts 230C, are managed at mobile phones, personal digital assistants, personal computers, etc., and are updated by more traditional synchronization operations or user entries. Data service provider 210 stores both live and standard contacts to protect against losing contact information at a mobile phone and to facilitate the transfer of contacts between different devices. In some implementations, however, data service provider 210 may not store standard contacts.

Using mobile phone carrier 240, mobile phones 260 communicate each of their contacts to the data service provider 210 for backup storage and update processing. Data service provider 210 stores current contact and metadata, such as status and presence information for each of these contacts. Depending on the particular implementation, data service provider 210 may store current information for each contact even if no mobile phone 260 includes the contact in its contact list or may defer storing contact and metadata information for a contact until at least one mobile phone 260 adds the contact to its contact list. At any rate, data service provider 210 stores current information for contact 230A, including status/presence 232A, permissions 234A, capabilities 236A, and contact information 238A for multiple forms of mobile phone initiated communication with contact 230A; current information for contact 230B, including status/presence 232B, permissions 234B, capabilities 236B, and contact information 238B for multiple forms of mobile phone initiated communication with contact 230B; and so on for other contacts 230C.

Based on the contacts communicated to data service provider 210 by mobile phones 260, data service provider 210 creates contact lists 220. Contact list 220A at data service provider 210 includes no live contacts 222A and two other contacts 224A, namely contact 230B and contact 230C as specified in contact list 220A at mobile phone 260A. Note that contact list 220A at mobile phone 260A does not include an automatic indicator for contact 230B. In alternative implementations, contact 230B could include a standard contact indicator, a manual live indicator, or some other type of indicator that could take any of a variety of other forms. Contact list 220B at data service provider 210 includes one live contact 222B, which indicates that contact 230A is a live contact for contact list 220B of mobile phone 260B, and one standard contact 224B, which indicates that contact 230C is a standard contact for contact list 220B. Although not explicitly shown, contact 230A at data service provider 210 also includes an indicator of some form to indicate which mobile phones, such as mobile phone 260B, include contact 230A as an automatic live contact to be updated as new information becomes available at data service provider 210.

Data service provider 210 also communicates with one or more PCs 270. Like mobile phone 260A, PC 270A stores user information 250A in the form of current contact, status, presence, capabilities, and permissions information for a user or owner of mobile phone 260A and PC 270A. (In some implementations, permissions information may be stored only at data service provider 210 and not at PC 270A.) PC 270A also stores contact list 220A, which includes contact 230B and other contacts 230C. Here too, contact 230B includes status/presence information 232B, capabilities 236B, and contact information 238B for multiple forms of mobile phone initiated communication with contact 230B. Status/presence information 232B, capabilities 236B, and contact information 238B are described in more detail below. Other PCs 270, such as PCs 270B, store information similar to that stored in PC With the foregoing background in mind some example implementations of maintaining current contact and metadata information for a contact that allows multiples forms of communication to be initiated from a mobile phone will be described. From automatic contact and metadata updates initiated by data service provider 210 and received through mobile phone carrier 240, mobile phone 260B periodically updates automatic live contact 230A. For example, changing user information 250A at PC 270A causes changed contact information to be sent to data service provider 210 for contact 230A. The changed contact information may include a new email address, phone number, picture representation, etc., for contact 230A at PC 270A. Data service provider updates contact 230A and determines that contact list 220B of mobile phone 260B includes contact 230A as an automatic live contact. Data service provider 210, therefore, sends an automatic contact update through the mobile phone carrier to mobile phone 260B. Accordingly, mobile phone 260B can initiate an email message with contact 230A based on the new contact information received in the contact information update. Updates to other types of contact information are handled in a similar fashion.

As indicated above, data service provider 210 also sends metadata updates to mobile phones 260 and PCs 270. For example, status information updates for mobile phones 260 are sent automatically to the data service provider based on changes in the operating mode of the mobile phones 260, such as when switching the phones on or off, to vibrate or ring mode, or from taking or ending a call. In one example implementation, switching mobile phone 260A to vibrate mode changes the contact's status to busy, taking a call changes the contact's status to on the phone, and so forth. Mobile phone 260A sends a status update for the contact to data service provider 210. Data service provider 210 updates contact 230A and determines that contact list 220B of mobile phone 260B includes contact 230A as an automatic live contact. Data service provider 210, therefore, sends an automatic status update through the mobile phone carrier 240 to mobile phone 260B, which updates contact 230A to reflect the status information update so that the new status information can be considered when initiating communication with contact 230A. Other types of metadata information updates are handled in a similar manner.

Some contact information updates and metadata information updates are relatively small and may be sent to/from mobile phones using the bandwidth set aside for standard types of signaling with a mobile phone. Other updates may be larger, and need to be divided into smaller units when sent to or received from a mobile phone. Alternatively, a data service provider and/or a mobile phone carrier may send a signal to a mobile phone that instructs the mobile phone to initiate a connection of some sort so that an update may be received.

Figure 3:
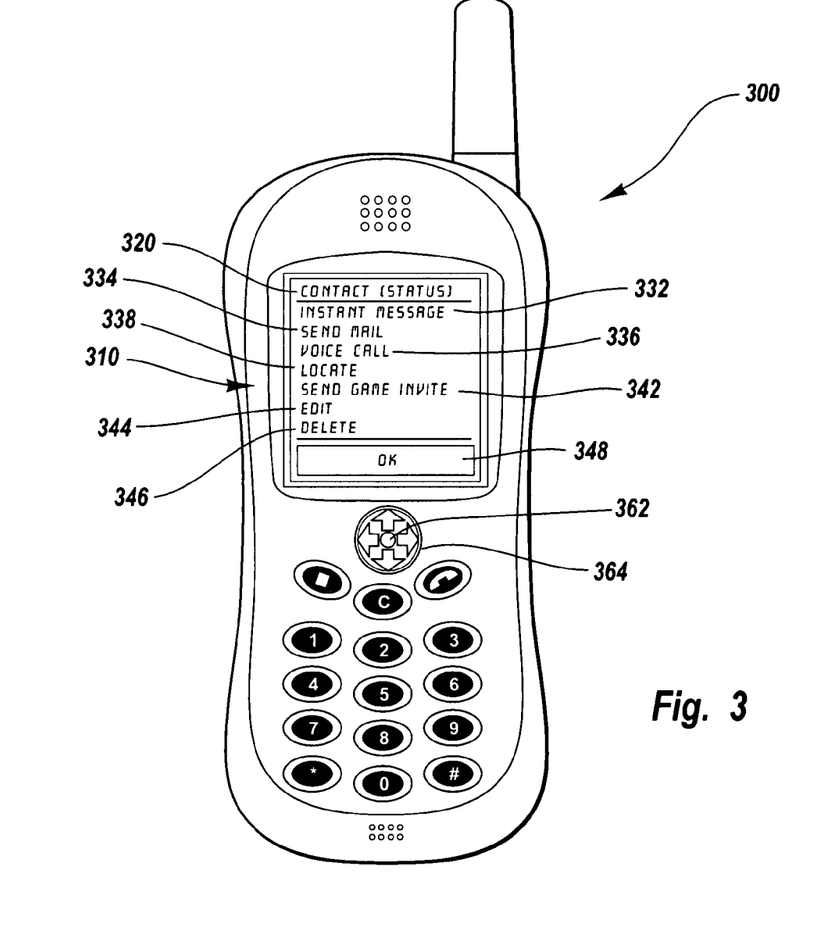
FIG. 3 shows an example mobile phone with contact and metadata information that is maintained in accordance with the present invention for multiple forms of communication.

FIG. 3 shows an example mobile phone 300 with contact and metadata information that is maintained for multiple forms of mobile phone communication. Display 310 shows the current status for contact 320, which is designated as an automatic live contact. Note that several mobile phone communication options are available for contact 320, including instant message 332, send email 334, voice call 336, locate 338, and send game invite 342. It is also possible to edit 344 or delete 346 contact 320. To facilitate communication, send email 334 may be highlighted by default based on the current status and/or other metadata for contact 320. For example, the status may indicate that contact 320 is taking a voice call, and therefore both instant message 332 and voice call 336 would be inappropriate.

Current status information and other metadata provide some social context for mobile phone communication. Although many carry mobile phones to increase accessibility, not all forms of communication are appropriate for all circumstances. For example, it may not be appropriate to initiate a voice call or instant message to discuss a trivial or humorous matter or to extend a game invitation when a contact is in a meeting, eating dinner at a restaurant, watching a movie, etc., as indicated by a status that corresponds to the contact's phone being switched to vibrate mode. Conversely, for urgent matters, locate 338 may be helpful to determine the location of the contact on a map. From the contact's location, it may be possible to infer the most appropriate form of communication to initiate. Furthermore, when reading received email, current metadata information allows the reader to determine if the sender is online, and therefore likely to engage in additional communication if needed or desired. One reciprocal benefit to the contact is an increased confidence that someone attempting to reach the contact has considered the social context provided by current metadata information and is initiating an appropriate form of communication given the circumstances.

Mobile phone 300 includes a directional button 364 and an action button 362. As indicated above, send email 334 may be highlighted because the current status and/or other metadata for contact 320 indicates that instant message 332 and voice call 336 are inappropriate. Send email 334 represents the default action for contact 320 based on current metadata information. Pressing the action button 362 selects (through OK button 348) the default action send email 334, and pressing the directional button 364 changes the currently highlight selection to another form of communication. FIG. 3 represents one of many possible examples for updating the default action associated with the action based on contact and metadata information updates received from the data service provider.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
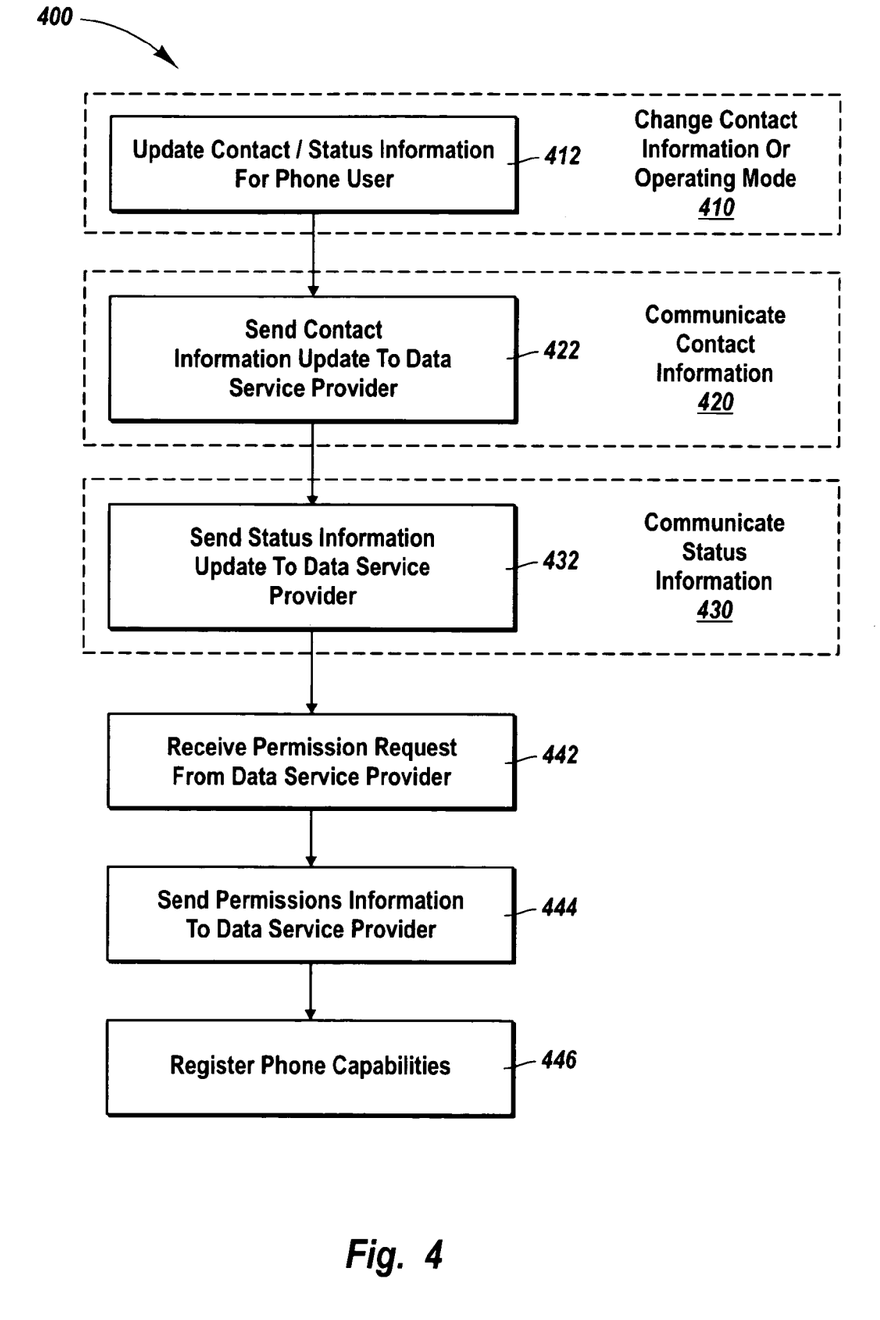
FIGS. 4 and 5A–5B show example acts and steps for methods of maintaining contact and metadata information in accordance with the present invention.
Figure 5A:
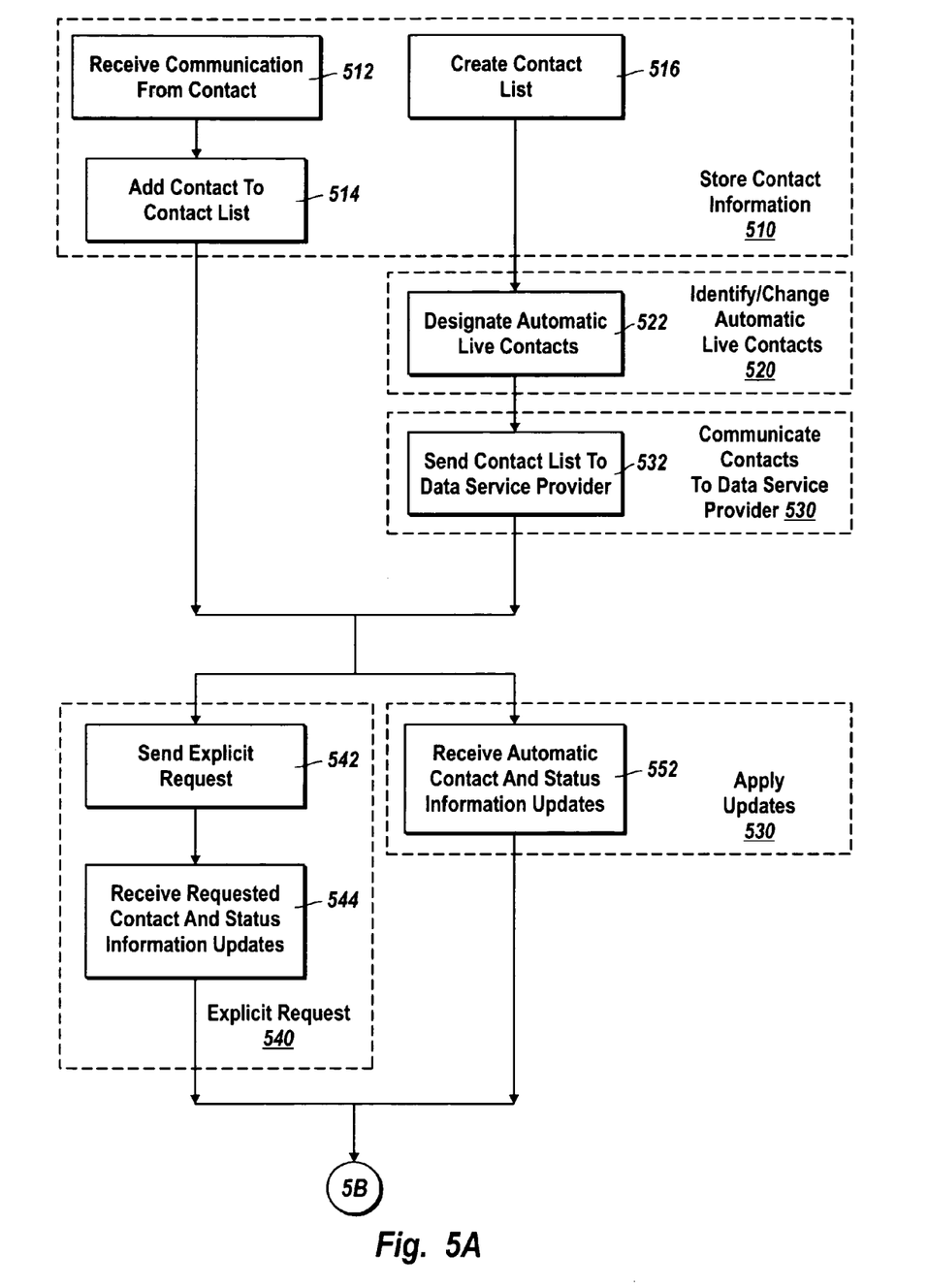
Figure 5B:
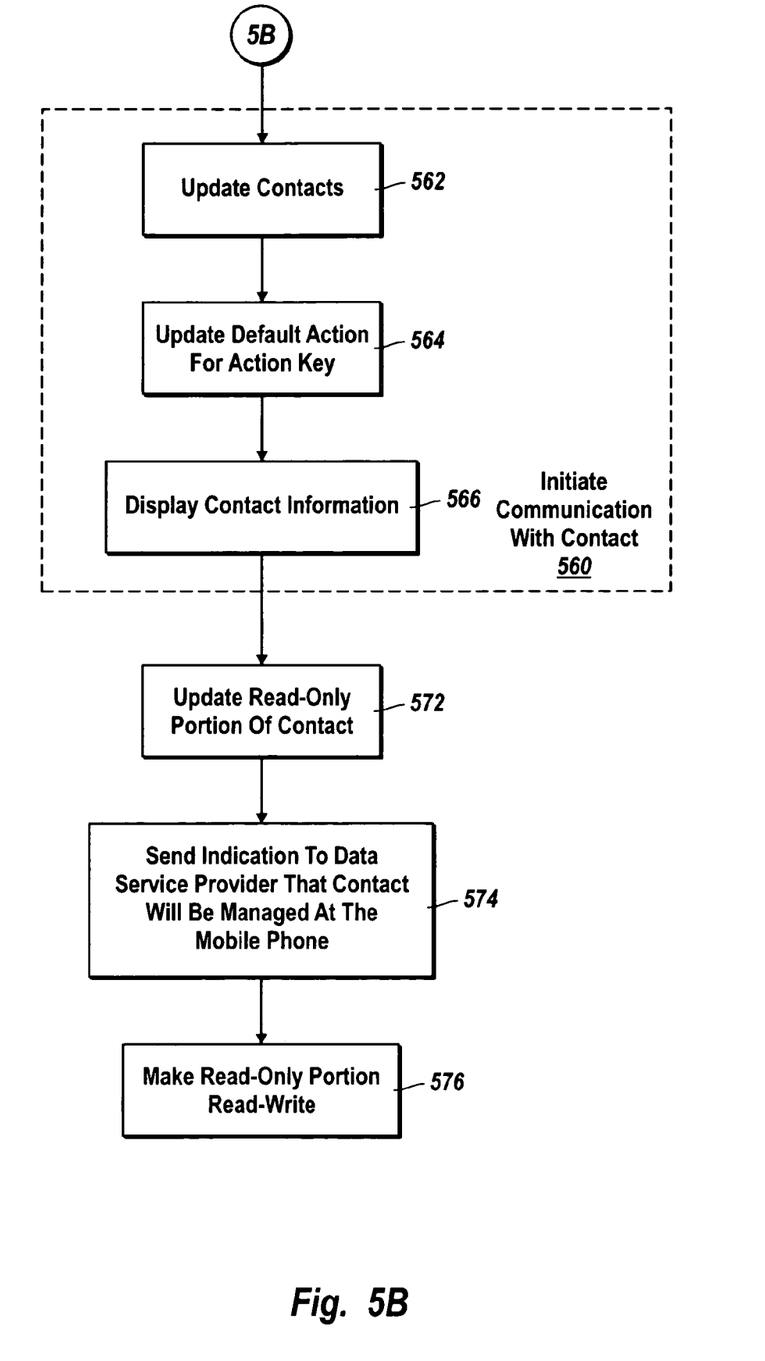

FIGS. 4 and 5A–5B show example acts and steps for methods of maintaining contact and metadata information in accordance with the present invention. Specifically, FIG. 4 focuses on the processing of contact information that is associated with a user of a mobile phone, and FIGS. 5A–5B focus on the processing of contact information for contacts other than the user of the mobile phone.

Beginning first then with FIG. 4, a step for changing (410) contact information for a user associated with a mobile phone or changing the operating mode of the mobile phone may include an act of updating (412) the contact or status information for a mobile phone user. A step for communicating (420) changed contact information to a data service provider for updating one or more other mobile phones with new contact information for the user associated with the mobile phone may include an act of sending (422) updated contact information to the data service provider for the user associated with the mobile phone.

A step for communicating (430) changed status information to the data service provider may include an act of automatically sending (432) a status update from the mobile phone based on a change in operating mode. The example method illustrated in FIG. 4 also includes acts of: receiving (442) a permission request from the data service provider; sending (444) permission information to the data service provider that specifies who is allowed to, receive either contact or metadata information updates that correspond to a user of a mobile phone; and registering (446) one or more capabilities of the mobile phone with the data service provider, such as display size or type, video capabilities, processing power, etc.

Turning next to FIGS. 5A–5B, a step for storing (510) contact information for multiple forms of communication with one or more contacts may include an act of creating (516) a contact list that stores the contact information or may include acts of receiving (512) a communication from a contact that in not included in the contact list, and adding (514) the contact to the contact list. A step for identifying or changing (520) each contact as either an automatic live contact to be synchronized as new information becomes available or as another contact that will not be synchronized as new information becomes available may include an act of designating (522) at least one contact as an automatic live contact, with any remaining contacts being designated as other contacts that will not be updated as new information becomes available in order to control airtime, bandwidth, or processing requirements at the mobile phone. The designation may be explicit or inferred.

A step for communicating (530) one or more contacts to the data service provider for update processing so that as new information becomes available for an automatic live contact, the data service provider can synchronize the mobile phone with the new information may include an act of sending (532) a contact list to the data service provider for backup storage and update processing. A step for periodically applying (550) automatic contact and status information updates received through the mobile phone network from the data service provider to one or more contacts identified as automatic live contacts may include an act of periodically receiving (552) automatic contact and status information updates from the data service provider. Alternatively, a step for explicitly requesting (540) contact information for one or more contacts from the data service provider may include acts of sending (542) an explicit request for a contact and status information update to the data service provider, and an act of receiving (544) the requested contact and status update.

A step for initiating (560) a form of communication with one or more contacts identified as automatic live contacts based on synchronized contact and metadata may include acts of: updating (562) updating at least one automatic live contact with received contact and metadata information updates; updating (564) a default action associated with a default action key based on contact and metadata information updates received from the data service provider; and displaying (566) at least a portion of the contact information on the mobile phone. The example method shown in FIGS. 5A–5B also may include acts of updating (572) a read-only portion of the contact information for a contact at the mobile phone, sending (574) an indication to the data service provider that the contact will be managed at the mobile phone and that no further updates should be received for the read-only portion of the contact information, and making (576) the read-only portion of the contact information read-write.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or oz wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
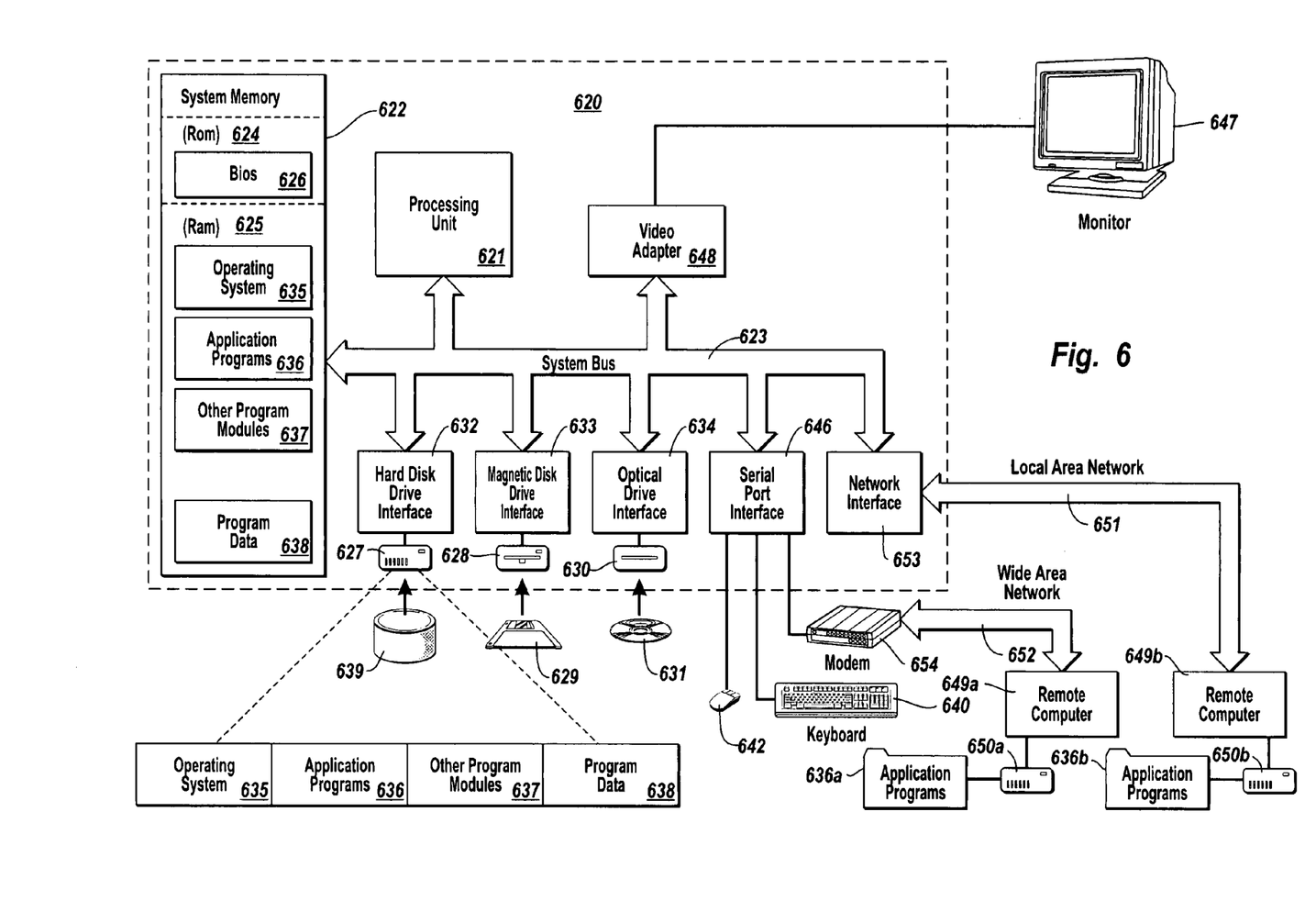
FIG. 6 illustrates an example computer system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. It should be noted however, that as mobile phones become more sophisticated, they are beginning to incorporate many of the components illustrated for conventional computer 620. Accordingly, with relatively minor adjustments, mostly with respect to input/output devices, the description of conventional computer 620 applies equally to mobile phones. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of, example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a mobile phone network that comprises a mobile phone carrier providing mobile phone service to a plurality of mobile phone users and a data service provider providing data services to the plurality of mobile phone users through the mobile phone carrier, a method of maintaining current contact and metadata information for initiating multiple forms of mobile phone communication with a contact, the method comprising acts of:
   - creating a contact list that stores contact information for multiple forms of communication with one or more contacts in the mobile phone;
   - designating at least one contact as an automatic live contact to be updated as new information becomes available, with any remaining contacts being designated as other contacts that will not be updated as new information becomes available;
   - sending the contact list to the data service provider for backup storage and update processing so that as new information becomes available for the at least one automatic live contact, the data service provider can send the new information to the mobile phone;
   - periodically receiving through the mobile phone carrier automatic contact and metadata information updates initiated by the data service provider for the at least one automatic live contact; and
   - updating the at least one automatic live contact with the received updates so that an appropriate form of communication may be initiated using accurate contact and metadata for the automatic live contact.

2. A method as recited in claim 1, wherein the multiple forms of communication for the at least one automatic live contact comprise two or more of voice, email, instant messaging, locate, and game communication, the method further comprising an act of locating the at least one automatic live contact.

3. A method as recited in claim 1, wherein at least one contact is designated as an other contact, the method further comprising acts of:
   - sending an explicit request for a contact or metadata update to the data service provider for the at least one other contact; and
   - receiving the requested contact or metadata update from the data service provider for the at least one other contact.

4. A method as recited in claim 1, further comprising acts of:
   - updating contact information for a user associated with the mobile phone; and
   - sending the updated contact information to the data service provider for updating one or more other mobile phones with new contact information for the user associated with the mobile phone.

5. A method as recited in claim 1, wherein a user associated with the mobile phone is also associated with a personal computer, the method further comprising an act of the data service provider sending the contact list to the personal computer.

6. A method as recited in claim 5, wherein the personal computer stores a plurality of contacts, the method further comprising an act of the user designating which of the plurality of contacts the data service provider should synchronize with the mobile phone.

7. A method as recited in claim 1, further comprising an act of displaying at least a portion of the contact information on the mobile phone.

8. A method as recited in claim 1, further comprising an act of sending permissions information to the data service provider, the permissions information specifying who is allowed to receive either contact or metadata updates corresponding to a user of the mobile phone.

9. A method as recited in claim 8, wherein at least a portion of the contact and metadata information corresponding to the user of the mobile phone are assigned one of a plurality of permission levels, and wherein the permissions information associates a permission level with at least one or more contacts who may request contact or metadata updates corresponding to the user of the mobile phone.

10. A method as recited in claim 1, further comprising an act of automatically sending a metadata update for the mobile phone based on a change in operating mode.

11. A method as recited in claim 10, wherein the change in operating mode comprises at least one of switching the mobile phone on, switching the mobile phone off, switching the mobile phone to vibrate mode, switching the mobile phone to ring mode, taking a call, and ending a call.

12. A method as recited in claim 1, wherein the mobile phone comprises an action key, the method further comprising an act of updating the default action associated with the action key based on contact and metadata information updates received from the data service provider for the at least one automatic live contact.

13. For a mobile phone network that comprises a mobile phone carrier providing mobile phone service to a plurality of mobile phone users and a data service provider providing data services to the plurality of mobile phone users through the mobile phone carrier, a computer program product comprising one or more computer readable media carrying computer executable instructions that implement a method of maintaining current contact and metadata information for initiating multiple forms of mobile phone communication with a contact, the method comprising acts of:
   - creating a contact list that stores contact information for multiple forms of communication with one or more contacts in the mobile phone;
   - designating at least one contact as an automatic live contact to be updated as new information becomes available, with any remaining contacts being designated: as other contacts that will not be updated as new information becomes available;
   - sending the contact list to the data service provider for backup storage and update processing so that as new information becomes available for the at least one automatic live contact, the data service provider can send the new information to the mobile phone;
   - periodically receiving through the mobile phone carrier automatic contact and metadata information updates from the data service provider for the at least one automatic live contact; and
   - updating the at least one automatic live contact with the received updates so that an appropriate form of communication may be initiated using accurate contact and metadata information for the automatic live contact.

14. A computer program product as recited in claim 13, wherein the multiple forms of communication for the at least one automatic live contact comprise two or more of voice, email, instant messaging, locate, and game communication, the method further comprising an act of initiating a game with the at least one automatic live contact.

15. A computer program product as recited in claim 13, the method further comprising an act of sending an explicit request for contact information for the one or more contacts to the data service provider.

16. A computer program product as recited in claim 15, further comprising acts of:

receiving a communication from a contact that is not included in the contact list;

adding the contact to the contact list; and receiving contact and metadata information for the contact in connection with the received communication.

17. A computer program product as recited in claim 15, the method further comprising acts of:

receiving a permission request from the data service provider to provide metadata and contact information updates for the mobile phone to another mobile phone; and sending permissions information to the data service provider that specifies whether or not the other mobile phone is allowed to receive metadata and contact information updates for the mobile phone.

18. A computer program product as recited in claim 15, wherein a portion of the contact information for a contact is initially read-only at the mobile phone, the method further comprising acts of:

updating the read-only portion of the contact information for the contact at the mobile phone;

sending an indication to the data service provider that the contact information for the contact will be managed at the mobile phone and no further updates should be received for the read-only portion of the contact information for the contact; and making the read-only portion of the contact information for the contact read-write.

19. A computer program product as recited in claim 15, wherein at least a portion of the contact information for a contact is read-only at the mobile phone, the method further comprising acts of:

attempting to update the read-only portion of the contact information for the contact at the mobile phone;

duplicating the read-only portion of the contact information for the contact so that the data service provider can continue to update the read-only portion; and making the duplicated read-only portion read-write so that the duplicated portion can be updated at the mobile phone.

20. A computing system in a mobile phone network that includes a mobile phone carrier providing mobile phone service to a plurality of mobile phone users and a data service provider providing data services to the plurality of mobile phone users through the mobile phone carrier, the computing system comprising one or more computer-readable storage media having computer-executable instructions for implementing a method of maintaining current contact and metadata information for initiating multiple forms of mobile phone communication with a contact, wherein the method comprises acts of:

creating a contact list that stores contact information for multiple forms of communication with one or more contacts in the mobile phone;

designating at least one contact as an automatic live contact to be updated as new information becomes available, with any remaining contacts being designated as other contacts that will not be updated as new information becomes available;

sending the contact list to the data service provider for backup storage and update processing so that as new information becomes available for the at least one automatic live contact, the data service provider can send the new information to the mobile phone;

periodically receiving through the mobile phone carrier automatic contact and metadata information updates initiated by the data service provider for the at least one automatic live contact; and updating the at least one automatic live contact with the received updates so that an appropriate form of communication may be initiated using accurate contact and metadata for the automatic live contact.

* * * * *